United States Patent Office 3,448,582
Patented June 10, 1969

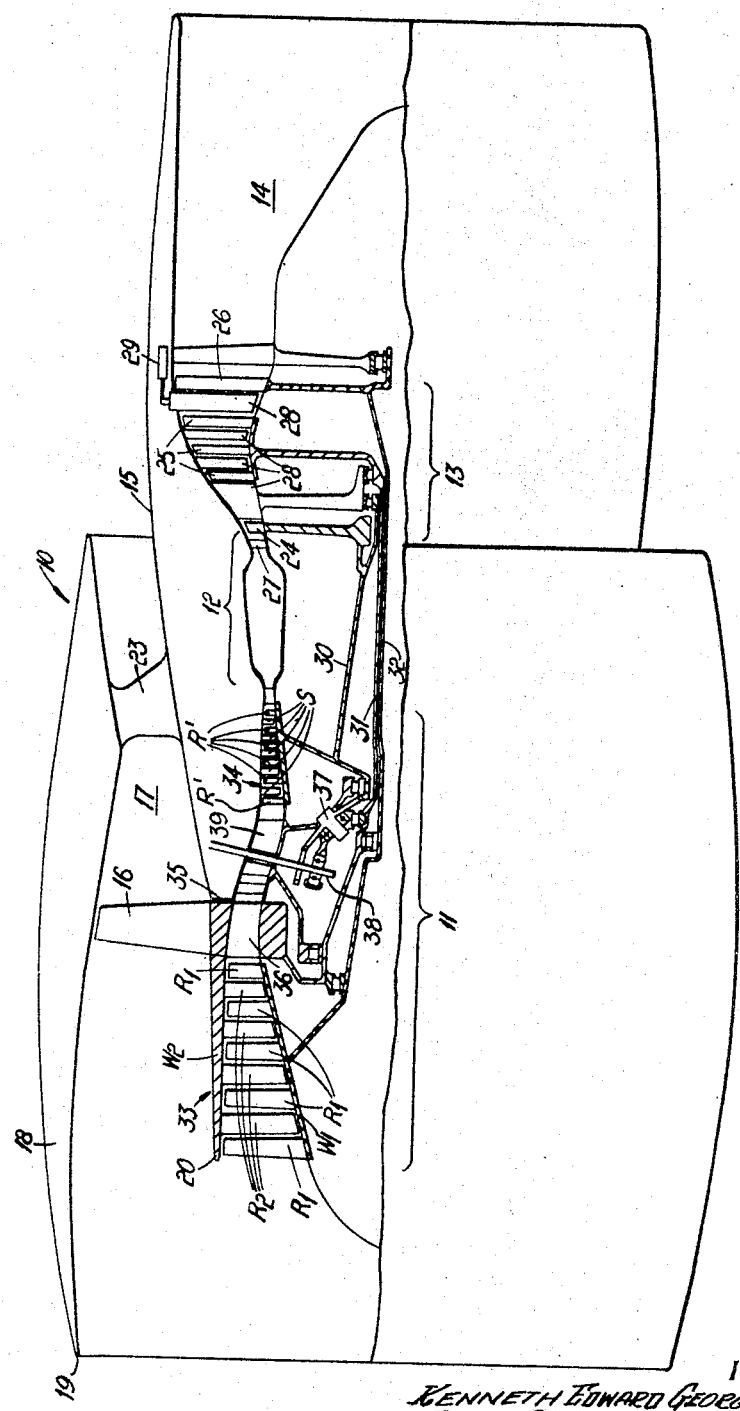

3,448,582
GAS TURBINE ENGINE
Kenneth Edward George Bracey and Paul Alfred Taylor, Derby, England, assignors to Rolls-Royce Limited, Derby, England, a British company
Filed Dec. 18, 1967, Ser. No. 691,393
Claims priority, application Great Britain, Jan. 6, 1967, 1,018/66
Int. Cl. F02c 3/06; F02k 3/02
U.S. Cl. 60—226
9 Claims

ABSTRACT OF THE DISCLOSURE

A gas turbine engine has a compressor all of whose bladed stages are constituted by rotor stages, successive rotor stages being attached respectively to inner and outer rotatable walls of the compressor which are drivingly connected to respective independently rotatable turbine rotor stages. A fan is disposed in an annular fan duct surrounding at least part of the compressor and is mounted on and driven by the outer rotatable wall of the compressor, the fan duct being connected to the engine casing only by struts extending across the fan duct downstream of the fan.

---

This invention relates to gas turbine engines.

According to the present invention there is provided a gas turbine engine including axial flow compressor means all of whose bladed stages are constituted by rotor stages, successive rotor stages of the compressor means being attached respectively to inner and outer rotatable duct-defining walls of the compressor means which are drivingly connected to respective independently rotatable turbine rotor stages, and a fan which is disposed in an annular fan duct surrounding at least part of said compressor means and which is mounted on and driven by the outer rotatable duct-defining wall, the fan duct being connected to a casing of the engine only by struts extending across the fan duct downstream of the fan therein.

Since the axial flow compressor means does not, according to this invention, have stator blading, it is not necessary to provide supporting struts for the compressor extending through the fan duct, so that the fan duct is unobstructed upstream of the fan. It has been found that this construction reduces noise.

Preferably, the said walls are drivingly connected to the said turbine rotor stages through respective concentrically disposed shafts which are disposed radially inwardly of the said turbine rotor stages and of the rotor stages of the compressor means.

The fan preferably has a single rotatable stage, the latter being preferably mounted on the downstream end of the outer rotatable duct-defining wall.

The fan duct may have an air intake which is disposed upstream of the air intake of the compressor means.

According to a preferred embodiment of the invention, the compressor means comprises a low pressure compressor, the engine also having an independently driven high pressure compressor adapted to receive air delivered by the low pressure compressor and having rotor stages alternating with stator stages. Preferably independently rotatable low, intermediate and high pressure turbines are provided and are drivingly connected by respective concentrically disposed shafts to the said inner and outer rotatable duct-defining walls of the low pressure compressor and the rotor stages of the high pressure compressor respectively.

A row of turbine stator guide vanes may be provided between each successive turbine rotor stage, the guide vanes in at least one of said rows being rotatable about their longitudinal axes to vary the flow capacity of the guide vanes to the gas flow therethrough.

The invention will be described, merely by way of example, with reference to the accompanying drawing, which is a diagrammatic side view, partly in section, of a gas turbine engine according to one embodiment of the invention.

Referring to the drawing, a gas turbine engine 10 comprises a compressor section 11, combustion equipment 12, a turbine section 13, and an annular exhaust duct 14. A fixed engine casing 15 encloses the exhaust duct 14, the turbine section 13, the combustion equipment 12, and part of the compressor section 11.

A fan 16, comprising a single bladed rotor stage, is mounted externally of the compressor section 11 within an annular fan duct 17 having a duct wall 18 which surrounds the compressor section 11 and is coaxial therewith. The fan duct 17 has an air intake 19 which is disposed upstream of the air intake 20 of the compressor section 11. The fan 16 could, if desired, comprise more than one bladed rotor stage.

The engine 10 is normally supported in an aircraft by way of supporting structure (not shown) attached to the fan duct wall 18. The remainder of the engine 10 is supported from the fan duct wall 18 by a plurality of struts 23 which are secured to the engine casing 15 and extend across the fan duct 17 downstream of the fan 16 therein.

The turbine section 13 has three independently rotatable turbines mounted in flow series between the combustion equipment 12 and the exhaust duct 14: a single stage high pressure turbine 24, a three stage intermediate pressure turbine 25, and a single stage low pressure turbine 26. The combustion equipment 12 is provided at its downstream end with a row of nozzle guide vanes 27 upstream of the high pressure turbine 26, and inter-stage turbine stator guide vanes 28 are disposed between successive turbine rotor stages.

At least one of the rows of turbine stator guide vanes 28 may have variable angle of incidence with respect to the direction of flow of hot gases through the turbine section 13. Thus, as illustrated, the final row of turbine stator guide vanes 28, disposed immediately upstream of the low pressure turbine 26, is provided with actuator means 29 for rotating each of said guide vanes 28 about its longitudinal axis. By rotating the stator guide vanes 28 in this way, the flow capacity of the guide vanes and therefore the mass flow through the turbine section 13 can be controlled to suit the operating conditions of the engine 10.

The respective high, intermediate and low pressure turbines 24, 25, 26, respectively are mounted on respective concentrically disposed shafts 30, 31, 32, the shafts 30 on which the high pressure turbine 24 is mounted being outermost and the shaft 32 on which the low pressure turbine 26 is mounted being innermost. The shafts 30, 31, 32, which are arranged radially inwardly of both the compressor section 11 and turbines 24–26, are supported in any convenient known manner from the engine casing 15 by means of suitable bearings at each end.

The compressor section 11 of the engine comprises a low pressure compressor 33 and a high pressure compressor 34. The low pressure compressor 33 comprises a plurality, in this case five in number, of interconnected first bladed rotor stages $R_1$ which are mounted on a rotatable inner duct-defining wall $W_1$ which is drivingly connected to the low pressure turbine 26 by way of the shaft 32. Respective second bladed rotor stages $R_2$ are disposed between successive first rotor stages $R_1$, each second motor stage $R_2$ being secured at its radially outer end to a rotatable outer duct-defining wall $W_2$. Thus all the bladed stages of the low pressure compressor 33 are rotor stages. The two rotatable walls $W_1$, $W_2$ define between them the annular-section flow duct of the low pressure compressor 33. The outer rotatable duct-defining wall $W_2$ is connected at its downstream end to the shaft 31 by way of a plurality of struts 36 of aerodynamic cross section extending across the flow duct of the compressor section 11 so that the outer wall $W_2$ is drivingly connected by way of the shaft 31 to the intermediate pressure turbine 25. The struts 36 constitute in effect rotatable outlet guide blades for the low pressure compressor 33. The rotatable outer duct-defining wall $W_2$ is secured to or formed integrally with the fan 16, the fan 16 being at the downstream end of the wall $W_2$.

The rotatable outer wall $W_2$ is a continuation upstream of the fixed engine casing 15. A seal, shown diagrammatically at 35, is provided between the downstream end of the rotatable wall $W_2$ and the upstream end of the fixed casing 15 to prevent leakage of the relatively high pressure air at the delivery end of the low pressure compressor into the fan duct 17.

The high pressure compressor 34 is of conventional axial flow design, comprising a plurality of bladed rotor stages $R_1$, in this case six in number, alternating with fixed bladed stator stages S.

In operation of the engine 10, the high pressure turbine 24 drives the high pressure compressor 34 through the shaft 30, while the low pressure turbine 26 drives the first rotor stages $R_1$ of the low pressure compressor 33 by way of the shaft 32 and the inner rotatable duct-defining wall $W_1$. The intermediate pressure turbine 25 drives, by way of the shaft 31, the rotatable outer duct-defining wall $W_2$ of the low pressure compressor 33, and therefore drives both the second rotor stages $R_2$ of the low pressure compressor 33 and the fan 16. In addition, a bevel gear drive, indicated diagrammatically at 37, may be taken from the high pressure turbine shaft 30 to drive engine auxiliary equipment (not shown) by way of a shaft 38 disposed within a hollow strut 39 extending across the gas flow duct between the low and high pressure compressors 33, 34.

The intermediate and low pressure turbines 25, 26 respectively are arranged to rotate in opposite directions so that the first and second rotor stages $R_1$, $R_2$ of the low pressure compressor 33 are driven in contra-rotation. In this way the operational tip speed of the low pressure turbine 26 can be lower than would be the case if the low pressure compressor 33 was of conventional design, with fixed stator blades.

It will be noted that, since the fan 16 and the outer duct-defining wall $W_2$ of the low pressure compressor 33 rotate as a whole, it is not necessary to provide any supporting structure for the low pressure compressor 33 extending across the fan duct 17 upstream of the fan 16. The fan duct 17 is therefore clear of obstruction upstream of the fan 16, and this helps to reduce the noise generated by the engine 10 in operation.

We claim:

1. A gas turbine engine including axial flow compressor means having rotatable inner and outer duct-defining walls, successive rotor stages of the compressor means being attached respectively to the said inner and outer walls, respective independently rotatable turbine rotor stages to which the said walls are drivingly connected, an annular fan duct surrounding at least part of said compressor means, a fan which is disposed in the fan duct and which is mounted on and driven by the outer rotatable duct-defining wall, and struts extending across the fan duct downstream of the fan therein, said struts being the only structural connection between the fan duct and the said casing, the fan duct being unobstructed upstream of the fan.

2. A gas turbine engine as claimed in claim 1 in which all the bladed stages of the compressor means are constituted by rotor stages.

3. A gas turbine engine as claimed in claim 1 in which the said walls are drivingly connected to the said turbine rotor stages through respective concentrically disposed shafts which are disposed radially inwardly of the said turbine rotor stages and of the rotor stages of the compressor means.

4. A gas turbine engine as claimed in claim 1 in which the fan has a single rotatable stage.

5. A gas turbine engine as claimed in claim 4 in which the single rotatable stage is mounted on the downstream end of the outer rotatable duct-defining wall.

6. A gas turbine engine as claimed in claim 1 in which the fan duct has an air intake which is disposed upstream of the air intake of the compressor means.

7. A gas turbine engine as claimed in claim 1 in which the said compressor means comprises a low pressure compressor, the engine also having an independently driven high pressure compressor adapted to receive air delivered by the low pressure compressor and having rotor stages alternating with stator stages.

8. A gas turbine engine as claimed in claim 7 in which independently rotatable low, intermediate, and high pressure turbines are provided and are drivingly connected by respective concentrically disposed shafts to the said inner and outer rotatable duct-defining walls of the low pressure compressor and to the rotor stages of the high pressure compressor respectively.

9. A gas turbine engine as claimed in claim 1 in which a row of turbine stator guide vanes is provided between each successive turbine rotor stage, the guide vanes in at least one of said rows being rotatable about their longitudinal axes to vary the flow capacity of the guide vanes to the gas flow therethrough.

References Cited

UNITED STATES PATENTS

| 2,404,767 | 7/1946 | Heppner | 60—39.16 |
| 2,563,270 | 8/1951 | Price | 60—268 |
| 3,385,064 | 5/1968 | Wilde | 60—226 |
| 3,385,509 | 5/1968 | Garnier | 60—39.16 |
| 3,391,540 | 7/1968 | Bauger | 60—226 |

CARLTON R. CROYLE, Primary Examiner.

D. HART, Assistant Examiner.

U.S. Cl. X.R.

60—39.16, 268; 230—122